US007717347B2

(12) United States Patent
Boyd et al.

(10) Patent No.: US 7,717,347 B2
(45) Date of Patent: *May 18, 2010

(54) FINANCIAL TRANSACTION CARD WITH POP-UP MEMBER

(75) Inventors: Shawn P. Boyd, St. Paul, MN (US); Charissa J. Peterson, Woodbury, MN (US); Erin M. Borkowski, Andover, MN (US); Timothy P. Clegg, Manhatten Beach, CA (US); Primoz Samardzija, Marina del Ray, CA (US)

(73) Assignee: Target Brands, Inc., Minneapolis, MN (US)

(*) Notice: Subject to any disclaimer, the term of this patent is extended or adjusted under 35 U.S.C. 154(b) by 690 days.

This patent is subject to a terminal disclaimer.

(21) Appl. No.: 11/615,861

(22) Filed: Dec. 22, 2006

(65) Prior Publication Data

US 2008/0149727 A1 Jun. 26, 2008

(51) Int. Cl.
*G06K 19/00* (2006.01)

(52) U.S. Cl. .................... 235/487; 40/124.08; 446/148; 206/308.1

(58) Field of Classification Search ................. 235/380; 206/575; 40/124.08, 124.11; 446/148
See application file for complete search history.

(56) References Cited

U.S. PATENT DOCUMENTS 1,343,984 A 6/1920 Ramsey
1,356,995 A 10/1920 Mayer
2,458,729 A 1/1949 Politzer
2,876,012 A 3/1959 Allen, Jr.
4,140,317 A 2/1979 Ramney
4,337,589 A 7/1982 Volkert et al.
4,377,917 A 3/1983 Guidry
4,620,725 A 11/1986 Maehashi
4,677,835 A 7/1987 Almblad
4,790,714 A 12/1988 Schnapp
D301,346 S 5/1989 Sjöstrand et al.
4,988,110 A 1/1991 Zuckerman et al.
5,096,751 A 3/1992 Duchek (Continued)

OTHER PUBLICATIONS

American Express Butterfly Card, http://www.coolhunting.com/archives/2006/06/american_expres.php, Jun. 22, 2006.

(Continued)

*Primary Examiner*—Thien M. Le
*Assistant Examiner*—Sonji Johnson
(74) *Attorney, Agent, or Firm*—Griffiths & Seaton PLLC

(57) ABSTRACT

A financial transaction card including an account identifier, a cover, and a pop-up member. The account identifier links the financial transaction card to at least one of a financial account or a financial record. The cover is configured to fold about a fold line between an open and a closed position. The pop-up member is coupled with the cover on both sides of the fold line and is configured to transition between a relatively flat position when the cover is in the closed position and an extended position when cover is in the open position. The pop-up member is stored between at least two portions of the cover when the cover is in the closed position. Methods of assembling a financial transaction card, methods of encouraging purchase and facilitating use of a stored-value card, and other embodiments are also disclosed.

23 Claims, 13 Drawing Sheets

U.S. PATENT DOCUMENTS

| | | | | |
|---|---|---|---|---|
| 5,100,151 | A | 3/1992 | Lyon et al. | |
| 5,110,135 | A | 5/1992 | Weber | |
| 5,263,890 | A * | 11/1993 | Dent, IV | 446/475 |
| 5,308,121 | A | 5/1994 | Gunn | |
| 5,435,085 | A | 7/1995 | Johnson | |
| 5,503,434 | A | 4/1996 | Gunn | |
| 5,538,291 | A | 7/1996 | Gustafson | |
| 5,588,233 | A | 12/1996 | Volkert et al. | |
| 5,658,620 | A * | 8/1997 | Ross | 428/9 |
| 5,882,763 | A | 3/1999 | Perttunen et al. | |
| 5,884,770 | A | 3/1999 | Galm | |
| 6,021,941 | A | 2/2000 | Schultz | |
| 6,076,296 | A | 6/2000 | Schaeffer | |
| 6,120,228 | A | 9/2000 | Exline | |
| 6,203,017 | B1 | 3/2001 | Schultz | |
| 6,311,418 | B1 | 11/2001 | Crowell | |
| 6,431,606 | B1 | 8/2002 | Lowe et al. | |
| 6,572,149 | B2 | 6/2003 | Long | |
| 7,004,398 | B1 | 2/2006 | Francis et al. | |
| 7,024,807 | B2 * | 4/2006 | Street | 40/124.06 |
| 7,200,960 | B1 | 4/2007 | Waggoner et al. | |
| 7,234,639 | B2 | 6/2007 | Schultz et al. | |
| 7,552,553 | B2 | 6/2009 | Kelly | |
| 2002/0143697 | A1 | 10/2002 | Gotfried | |
| 2003/0097773 | A1 | 5/2003 | Oh | |
| 2003/0150142 | A1 | 8/2003 | Street | |
| 2004/0007814 | A1 | 1/2004 | Senart | |
| 2004/0079275 | A1 | 4/2004 | Falla | |
| 2004/0093773 | A1 | 5/2004 | Clark | |
| 2006/0080871 | A1 | 4/2006 | McGoey et al. | |
| 2006/0186196 | A1 | 8/2006 | Schultz et al. | |
| 2007/0040036 | A1 | 2/2007 | Hallbauer et al. | |
| 2007/0152066 | A1 | 7/2007 | Colby et al. | |
| 2008/0009221 | A1 * | 1/2008 | Nelson et al. | 446/175 |
| 2009/0318052 | A1 * | 12/2009 | Prescott | 446/148 |

OTHER PUBLICATIONS

Americhip Greetings, http://www.americhip.com/greetings/holiday/index.html, printed Dec. 19, 2006.

* cited by examiner

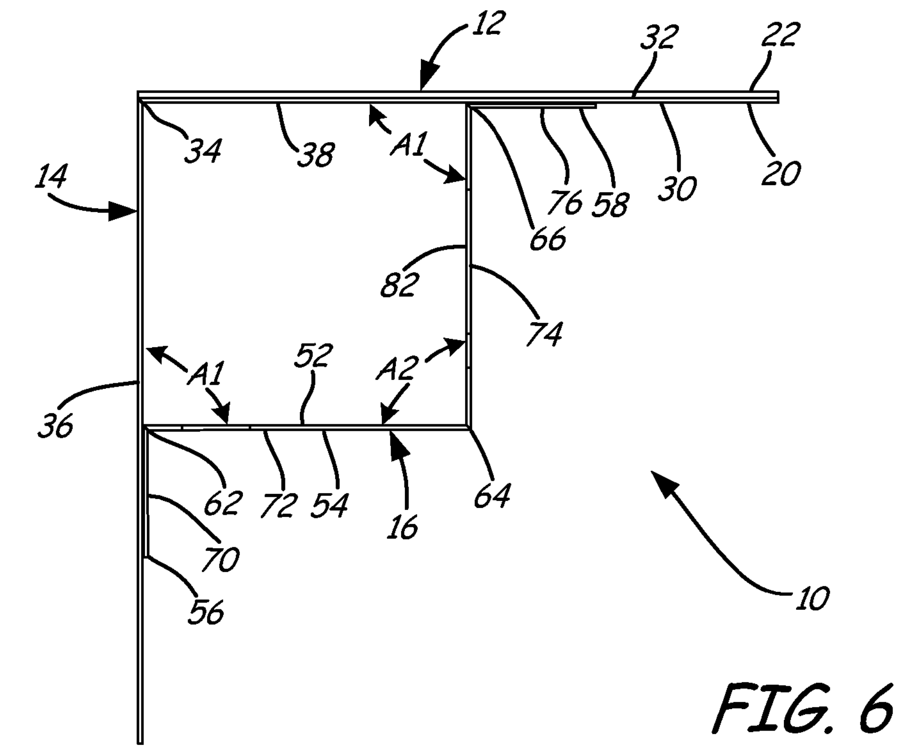
FIG. 6
FIG. 7
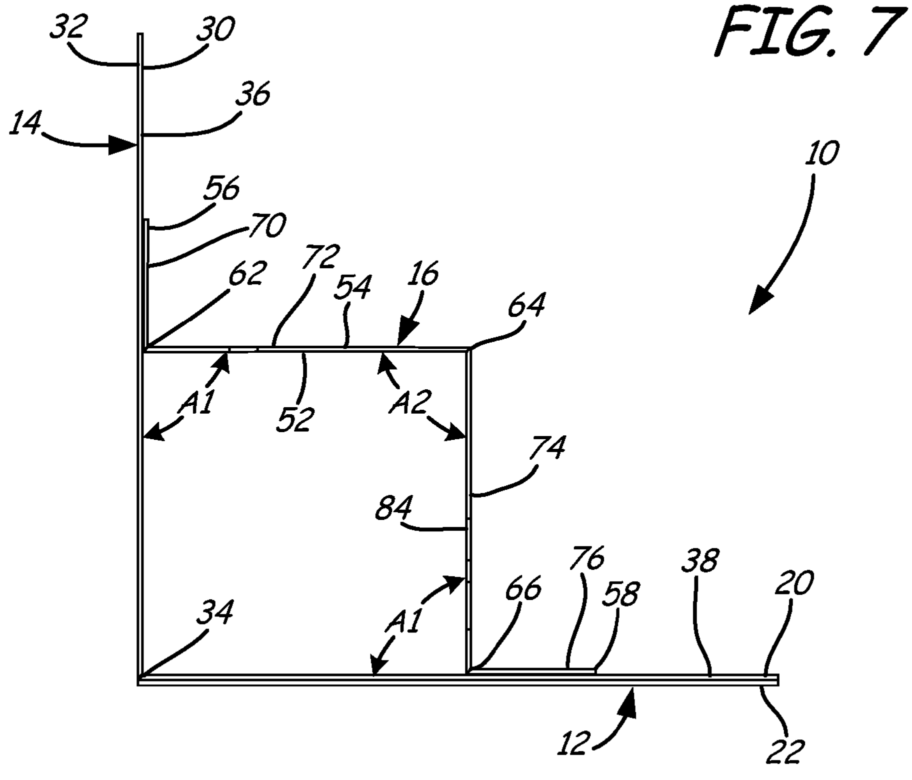

FINANCIAL TRANSACTION CARD WITH POP-UP MEMBER

BACKGROUND OF THE INVENTION

Stored-value cards and other financial transactions cards come in many forms. A gift card, for example, is a type of stored-value card that includes pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards provide a number of advantages to both the consumer and the retailer.

SUMMARY OF THE INVENTION

One aspect of the present invention relates to a financial transaction card including an account identifier, a cover, and a pop-up member. The account identifier links the financial transaction card to at least one of a financial account or a financial record. The cover is configured to fold about a fold line between an open and a closed position. The pop-up member is coupled with the cover on both sides of the fold line and is configured to transition between a relatively flat position when the cover is in the closed position and an extended position when cover is in the open position. The pop-up member is stored between at least two portions of the cover when the cover is in the closed position. Other related products and methods are also disclosed and provide additional advantages.

BRIEF DESCRIPTION OF THE DRAWINGS

Embodiments of the invention will be described with respect to the figures, in which like reference numerals denote like elements, and in which:

FIG. 6 is a top view illustrating the stored-value card of FIG. 1 in the open position, according to one embodiment of the present invention.

FIG. 7 is a bottom view illustrating the stored-value card of FIG. 1 in the open position, according to one embodiment of the present invention.

DETAILED DESCRIPTION

Gift cards, e.g., stored-value cards, or other financial transaction cards are adapted for making purchases of goods and/or services at e.g., a retail store or website. According to one embodiment, an original consumer buys a stored-value card to give a recipient who in turn is able to use the stored-value card at a retail store or setting to pay for goods and/or services. A stored-value card, according to embodiments of the present invention, provides the consumer and recipient with extra amusement due to a pop-up feature of the stored-value card in addition to the ability to pay for goods and/or services with the stored-value card.

Figure 8:
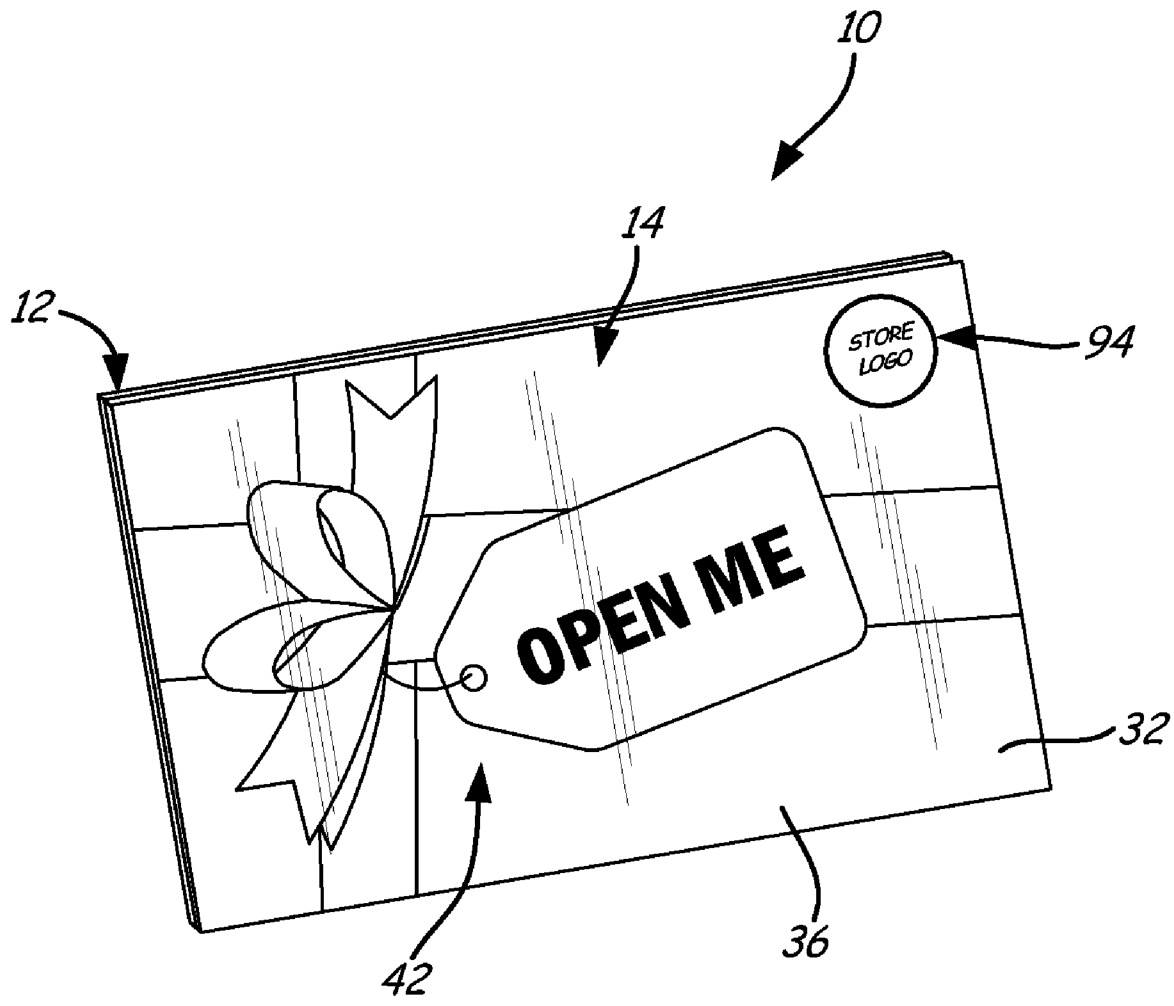
FIG. 8 is a perspective view illustrating the stored-value card of FIG. 1 in a closed position, according to one embodiment of the present invention.

Turning to the figures, FIGS. 1-7 illustrate various views of a stored-value card 10 in an open position and FIG. 8 illustrates stored-value card 10 in a closed position, according to one embodiment of the present invention. The stored-value card 10 includes a first member or substrate 12 and an auxiliary member or cover 14. Substrate 12 provides overall rigidity to stored-value card 10 and supports cover 14. Cover 14 is coupled to substrate 12 and is foldable between an open position (as illustrated in FIGS. 1-7) and a closed position (as illustrated in FIG. 8). In one embodiment, at least one pop-up member 16 is coupled with cover 14 and is configured to transition from a relatively flat position when cover 14 is closed to a more three-dimensional position when cover 14 is opened and vice versa. The pop-up feature of stored-value card 10 both amuses and attracts the attention of a card bearer or other surrounding individuals. Due at least in part to the amusement and attractiveness of the pop-up member 16, the stored-value card 10 generally promotes the sale and continued use of stored-value card 10.

Figure 3:
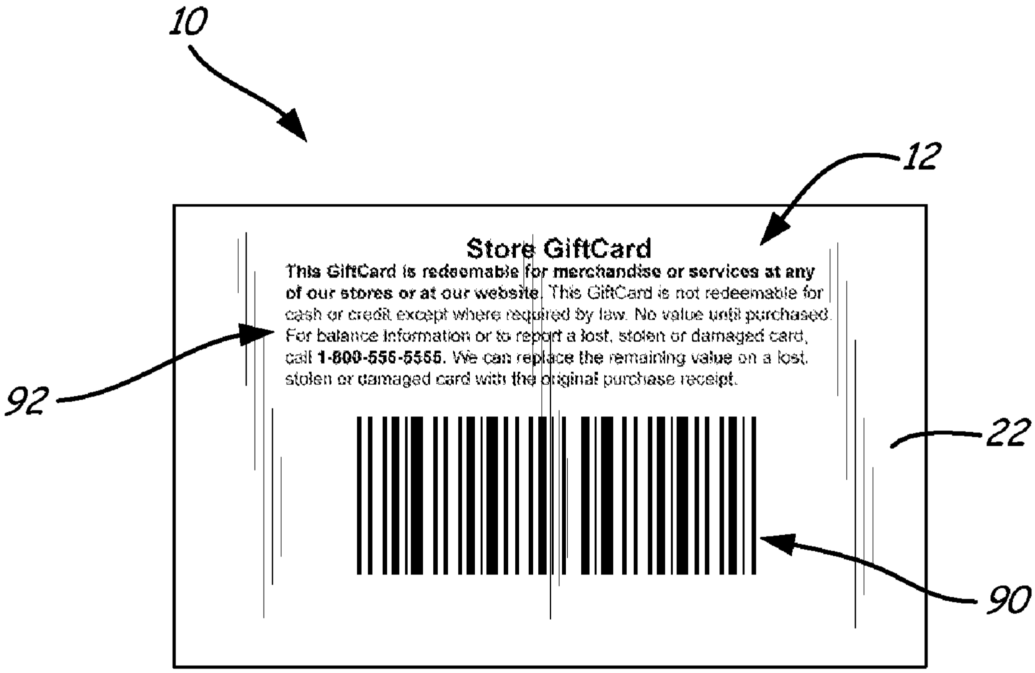
FIG. 3 is a rear view illustrating the stored-value card of FIG. 1 in the open position, according to one embodiment of the present invention.
Figure 4:
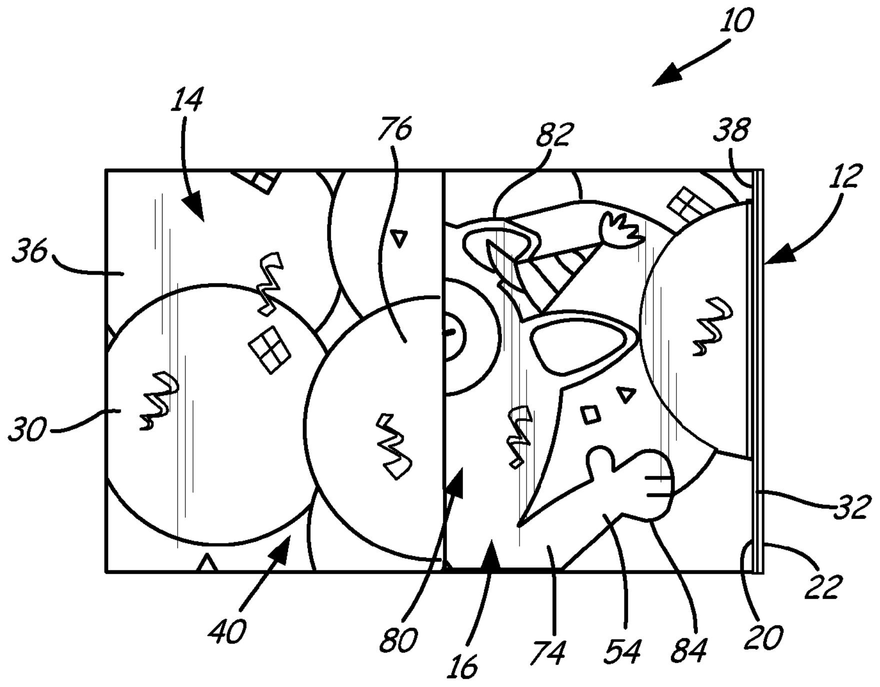
FIG. 4 is a right side view illustrating the stored-value card of FIG. 1 the an open position, according to one embodiment of the present invention.
Figure 9:
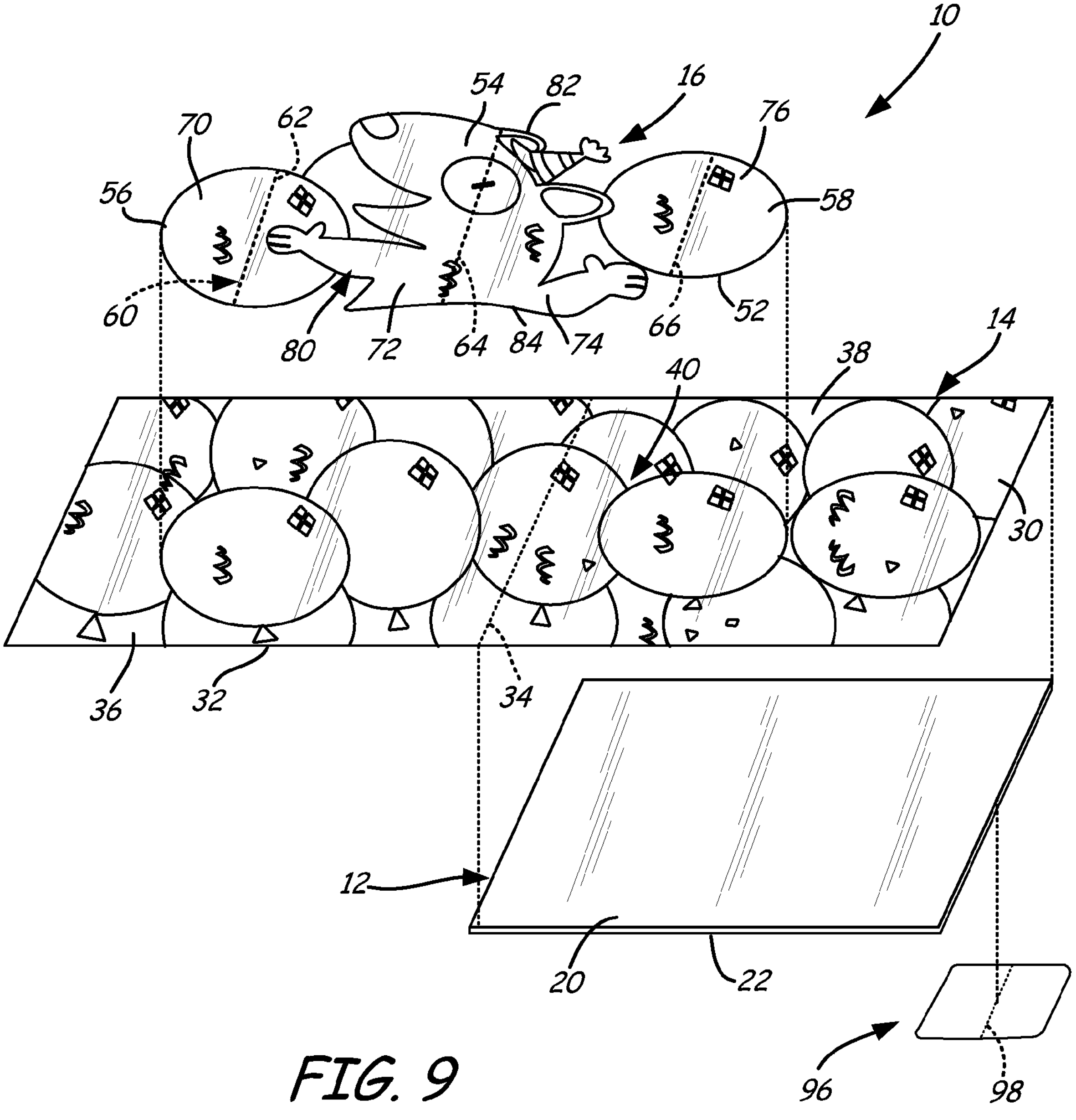
FIG. 9 is an exploded perspective view illustrating the stored-value card of FIG. 1, according to one embodiment of the present invention.

Primarily referring to the illustrations of FIGS. 3 and 9, substrate 12 is generally a panel defining a first surface 20 (FIG. 9) and a second surface 22 opposite the first surface 20. Second surface 22 is substantially planar, and in one embodiment, first and second surfaces 20 and 22 are both substantially planar. In one embodiment, substrate 12 is substantially rectangular in shape and sized similarly to an identification card, a credit card, or other card sized to fit in a wallet of a card bearer. In particular, in one embodiment, substrate 12 is about 8.5 cm long, about 5.5 cm wide, and less than about 1 mm thick. In other embodiments, substrate 12 is otherwise shaped as a square, circle, oval, star, or any other suitable shape.

Substrate 12 is formed of a somewhat rigid yet flexible material similar to that commonly used for identification cards, credit cards, etc. More specifically, in one embodiment, substrate 12 is formed of paper, cardstock, plastic, e.g. polycarbonate, polystyrene, or polyvinyl chloride (PVC), or other suitable material. In one embodiment, substrate 12 is formed of injected molded plastic or cut from sheet-stock plastic material. Accordingly, substrate 12 is one example of means for supporting at least cover 14 and pop-up member 16.

Referring to FIG. 9, cover 14 comprises a single layer or multiple layers of paper or plastic material, for example, generally in the form of a relatively stiff but bendable/flexible card defining an inside surface 30 and an outside surface 32. In one embodiment, cover 14 includes a fold line 34 and is configured to transition between an open position (e.g., the partially open position of FIG. 1) and a closed position (FIG. 8) when folded about fold line 34. In one example, cover 14 is a bi-fold substrate and defines a first cover panel 36 and a second cover panel 38 on opposite sides of fold line 34. Other means of hingedly connecting first cover panel 36 and 38 other than with a integrally formed fold line 34 are also contemplated. For instance, in one embodiment, first and second cover panels 36 and 38 are separately formed and hingedly coupled with one another to define fold line 34 along a resulting boundary line. In one example, first and second cover panels 36 and 38 are substantially similar in size with fold line 34 extending therebetween. In this manner, cover 14 transitions from a substantially flat, open position to a bi-folded, closed position. More specifically, to close cover 14, inside surface 30 of first cover panel 36 is rotated or folded toward inside surface 30 of second cover panel 38. In one example, fold line 34 is one of a plurality of fold lines (not shown) defined by cover 14.

In one embodiment, cover 14 displays indicia, graphics, or text information including store logo(s), store name(s), slogans, advertising, instructions, directions, brand indicia, promotional information, holiday indicia, seasonal indicia, media format identifiers, characters, and/or other information. For example, inside surface 30 of cover 14 includes indicia 40 configured to associate cover 14 with a particular event, occasion, season, promotion, and/or to visually correspond cover 14 with other portions of stored-value card 10 such as pop-up member 16 as will be further described below.

Figure 5:
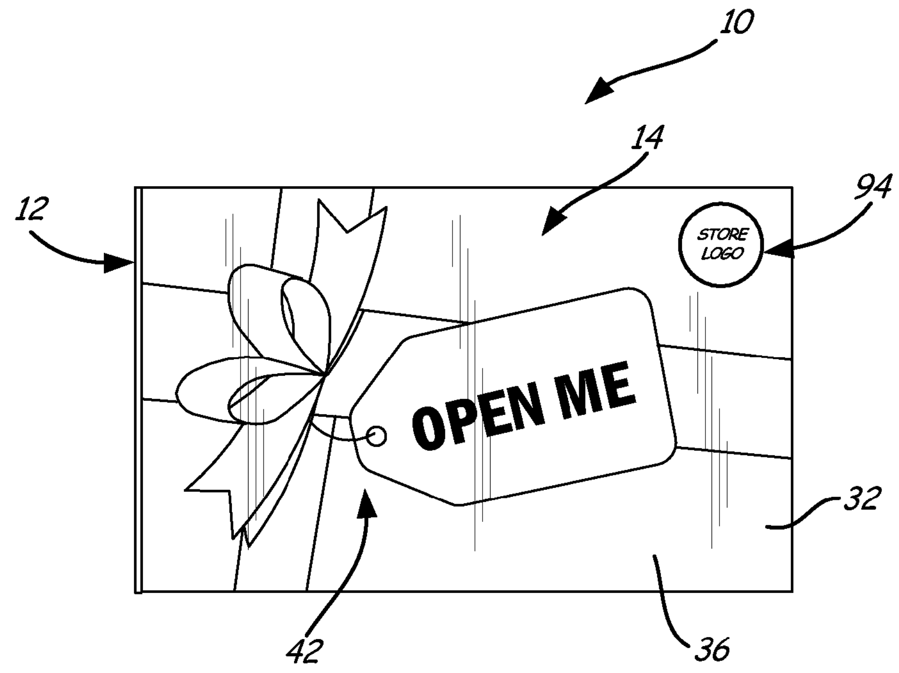
FIG. 5 is a left side view illustrating the stored-value card of FIG. 1 in the open position, according to one embodiment of the present invention.

Additionally referring to FIG. 5, outside surface 32 of cover 14 may also include any suitable indicia such as decorative indicia 42. In one example, outside surface 32 of first cover panel 36 includes indicia 42 while outside surface 32 of second cover panel is substantially left blank. In one embodiment, decorative indicia 42 are configured to correspond at least somewhat with indicia 40. In one example, indicia 42 provide instructions facilitating use of stored-value card 10 for amusement purposes. For instance, indicia 42 may include the phrase "Open me," similar instructions, and/or other related graphics.

Figure 1:
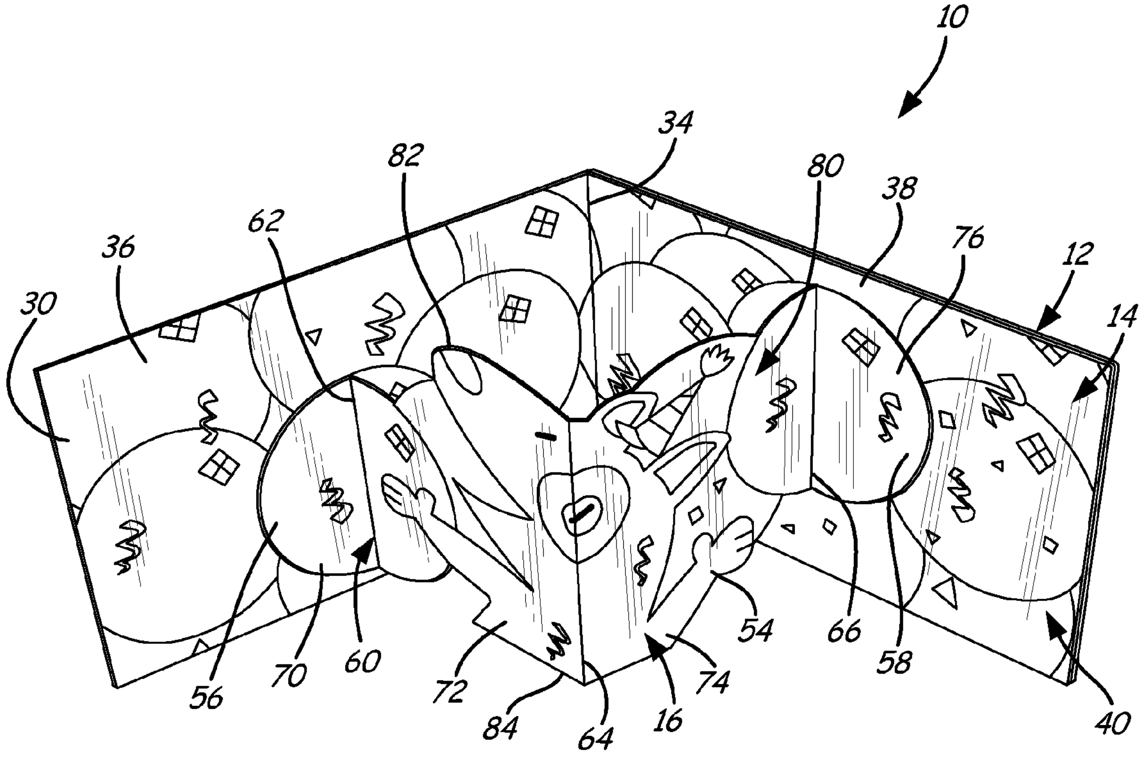
FIG. 1 is a perspective view illustrating a stored-value card in an open position, according to one embodiment of the present invention.
Figure 2:
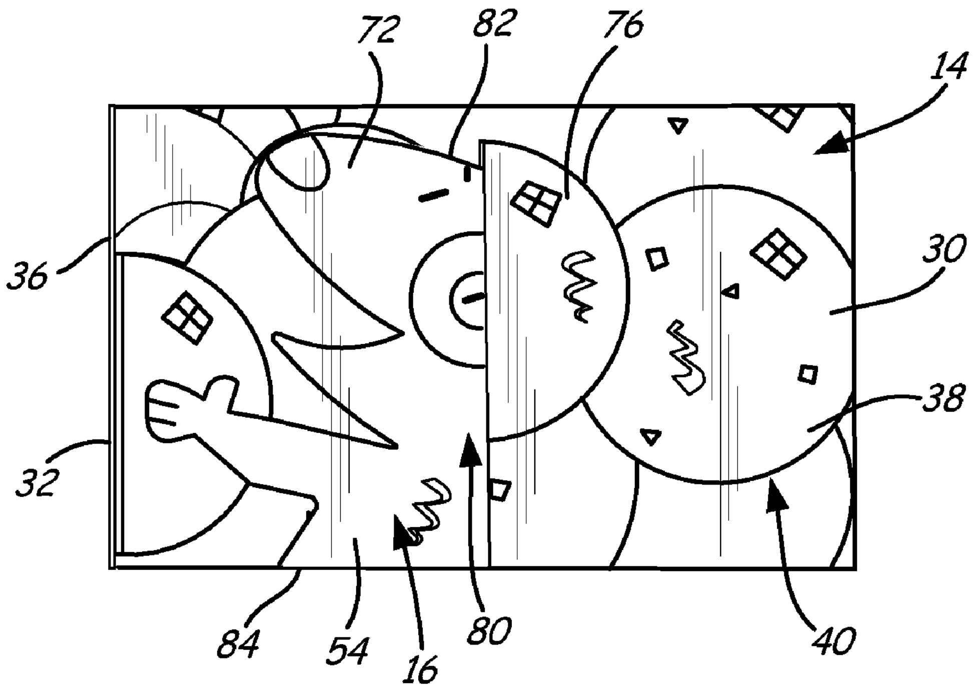
FIG. 2 is a front view illustrating the stored-value card of FIG. 1 in the open position, according to one embodiment of the present invention.

Referring primarily to FIGS. 1 and 9, in one embodiment, stored-value card 10 includes an auxiliary or pop-up member 16 in the form of a relatively stiff but bendable/flexible card defining an inside surface 52 and an outside surface 54. Pop-up member 16 is configured to be coupled with inside surface 30 of cover 14 such that pop-up member 16 extends outwardly from inside surface 30 when cover 14 is in an open position and collapses or folds down when cover 14 is closed such that pop-up member 16 can be maintained in a folded, relatively flat configuration between inside surface 30 of first and second panels 36 and 38 of cover 14.

Pop-up member 16 can be formed in any number of configurations as will be apparent to one of skill in the art upon reading this application. In the embodiment illustrated in FIGS. 1-9, pop-up member 16 is generally elongated to define a first longitudinal end 56 and a second longitudinal end 58 opposite one another, and has a length and width that are each less than a length and width of cover 14. Pop-up member 16 includes a plurality of fold lines 60, which generally divide pop-up member 16 into a plurality of portions.

In particular, in one example, the plurality of fold lines 60 include a first, second, and third fold line 62, 64, and 66, respectively, which extend parallel to and are longitudinally spaced from one another along pop-up member 16. First fold line 62 is relatively near first longitudinal end 56, third fold line 66 is relatively near second longitudinal end 58, and second fold line 64 is positioned between first and third fold lines 62 and 66. As such, a first portion 70 of pop-up member 16 is defined between first longitudinal end 56 and first fold line 62, a second portion 72 of pop-up member 16 is defined between first and second fold lines 62 and 64, a third portion 74 of pop-up member 16 is defined between second and third fold lines 64 and 66, and a fourth portion 76 of pop-up member 16 is defined between third fold line 66 and second longitudinal end 58.

In one embodiment, outside surface 54 of pop-up member 16 includes indicia 80 configured to complement or otherwise correspond with indicia 40 on inside surface 30 of cover 14. For instance, where indicia 40 on cover 14 depict a plurality of balloons, outside surface 54 of pop-up member 16 may also include a plurality of balloons and/or a subject holding or otherwise surrounded by balloons such that the images of indicia 40 and 80 collectively define a visual scene. In one example, longitudinal edges 82 and 84 of pop-up member 16 are cut-out or otherwise formed to outline or correspond with the shapes depicted by indicia 80. As such, longitudinal edges 82 and 84 may be substantially non-linear. In other embodiments, indicia 40 and 80 may be eliminated.

Referring to FIG. 3, in one embodiment, stored-value card 10 includes an account identifier 90, such as a barcode, a magnetic strip, a smart chip or other electronic device, a radio frequency identification (RFID) device, or other suitable identifier readily readable by a point-of-sale terminal, account access station, kiosk, or other suitable device. In one embodiment, account identifier 90 is printed on or otherwise applied to second surface 22 of substrate 12. Account identifier 90 indicates a financial account or record to which stored-value card 10 is linked. The financial account or record of the monetary balance on stored-value card 10 optionally is maintained on a database, other electronic or manual record-keeping system, or, in the case of "smart" cards for example, on a chip or other electronic device on/in stored-value card 10 itself. Accordingly, by scanning account identifier 90, a financial account or record linked to stored-value card 10 is identified and can subsequently be activated, have amounts debited therefrom, and/or have amounts added thereto. Account identifier 90 is one example of means for associating stored-value card 10 with a financial account or a financial record.

Stored-value card 10 may also include redemption indicia 92 such as, for example, on second surface 22 of substrate 12. Redemption indicia 92 indicate that stored-value card 10 is redeemable for the purchase of goods and/or services and that, upon use, a value of the purchased goods and/or services will be deducted from the financial account or record linked to stored-value card 10. In one embodiment, redemption indicia 92 include phrases such as "<NAME OF STORE> GiftCard"

and "This GiftCard is redeemable for merchandise or services at any of our stores or at our website," and/or provides help or phone line information in the case of a lost, stolen, or damaged stored-value card, etc.

In one example, stored-vale card 10 includes brand indicia 94 (FIG. 5) identifying a store, brand, department, etc. and/or services associated with substrate 12. In one example, brand indicia 94 relate to a retailer configured to accept stored-value card 10 as payment for goods and/or services. In one embodiment, brand indicia 94 are included any one or more of substrate 12, cover 14, and pop-up member 16. Any of indicia 40, 80, 92, and 94 or other indicia optionally may appear anywhere on stored-value card 10. Additional information besides that specifically described and illustrated herein may also be included.

During assembly, pop-up member 16 is coupled with cover 14, more specifically, with inside surface 30 of cover 14. In one embodiment, inside surface 52 of first portion 70 is coupled with inside surface 30 of first cover panel 36, and inside surface 52 of fourth portion 76 is coupled with inside surface 30 of second cover panel 38 as illustrated with reference to FIGS. 1-7 and 9. In one example, second and third portions 72 and 74 are not directly coupled with cover 14, and rather, are only coupled with cover 14 via their association with first and fourth portions 70 and 76. With this assembly in mind, second and third portions 72 and 74 are each configured to fold out away from inside surface 30 of cover 14 about fold lines 62 and 64, respectively. In one embodiment, second and third portions 72 and 74 each fold away from inside surface 30 with an angle (generally indicated at A1 in FIGS. 6 and 7) that is relatively small when cover 14 is open, but which becomes relatively large, in one example, approaching 180°, when cover 14 is closed.

To facilitate transitioning or folding of pop-up member 16 between open and closed positions, pop-up member 16 generally folds about second fold line 64 in the opposite direction as pop-up member 16 folds about first and third fold lines 62 and 66. More specifically, second portion 72 and third portion 74 of pop-up member 16 are configured to fold such that their inside surfaces 52 (FIGS. 6, 7, and 9) are moved toward each other as cover 14 is closed. In one example, when cover 14 is closed, inside surface 52 of second portion 72 of pop-up member 16 interfaces with or abuts inside surface 52 of third portion 74 of pop-up member 16. As such, in one example, an angle (generally indicated at A2 in FIGS. 6 and 7) generally transitions from a relatively large angle when cover 14 is open to a relatively small angle when cover 14 is closed. In this manner, in one embodiment, the size of angle A1 is inversely proportionate to the size of angle A2.

Either prior to or subsequent to coupling cover 14 with pop-up member 16, in one example, cover 14 is coupled with substrate 12. In particular, as illustrated with reference to FIG. 9, outside surface 32 of second cover panel 38 is adhered to or otherwise coupled with first surface 20 of substrate 12. In one example, second cover panel 38 is similar in size and shape to substrate 12 such that, upon assembly, second cover panel 38 substantially entirely covers first surface 20 of substrate 12. Such assembly of cover 14 with substrate 12 bolsters the overall strength and rigidity of stored-value card 10, thereby decreasing the amount of noticeable wear of stored-value card 10. In one embodiment, substrate 12 is formed of a plastic or similar member having greater strength than the material from which cover 14 is formed. In this manner, substrates 12 provides rigidity to stored-value card 10 while the lesser strength and greater flexibility of cover 14 and pop-up member 16 allow for more detailed and intricate cuts and effects to be created than if stored-value card 10 where made entirely of a single type of material. In one embodiment, substrate 12 is eliminated.

Once assembled, stored-value card 10 is configured such that when cover 14 is in the closed position, pop-up member 16 is folded relatively flat (e.g., is collapsed) such that pop-up member 16 is interposed between inside surfaces 30 of first and second cover panels 36 and 38 during storage and periods of non-use. When first cover panel 36 is rotated about fold line 34 to transition cover 14 toward the open position, pop-up member 16 hinges about fold lines 62, 64, and 66 to extend outwardly away from inside surface 30 of cover, in other words, pop-up member 16 pops-up from cover 14. In one embodiment, when pop-up member 16 hinges about fold lines 62, 64, and 66 to extend outwardly away from inside surface 30 of cover, angles A1 defined thereby decrease and angle A2 increases.

As generally illustrated in FIG. 9, in one embodiment, at least during packaging and prior to first use, stored-value card 10 is provided with a sticker 96. Sticker 96 is configured to maintain stored-value card 10, more particularly, cover 14 in a closed position. In one example, sticker 96 is partially affixed to second surface 22 of substrate 12, is folded over ends of first and second cover panels 36 and 38 about a fold line (generally indicated at 98), and is affixed to outside surface 32 of first cover panel 36 thereby holding cover 14 in a closed position. Sticker 96 is generally easily removable when desired such that sticker 96 can be peeled from or otherwise removed from sticker 10 to allow cover 14 to be opened. In one embodiment, sticker 96 is one of translucent and transparent. In one embodiment, sticker 96 is eliminated or otherwise placed on stored-value card 10 to selectively maintain cover 14 in a closed position.

Figure 10:
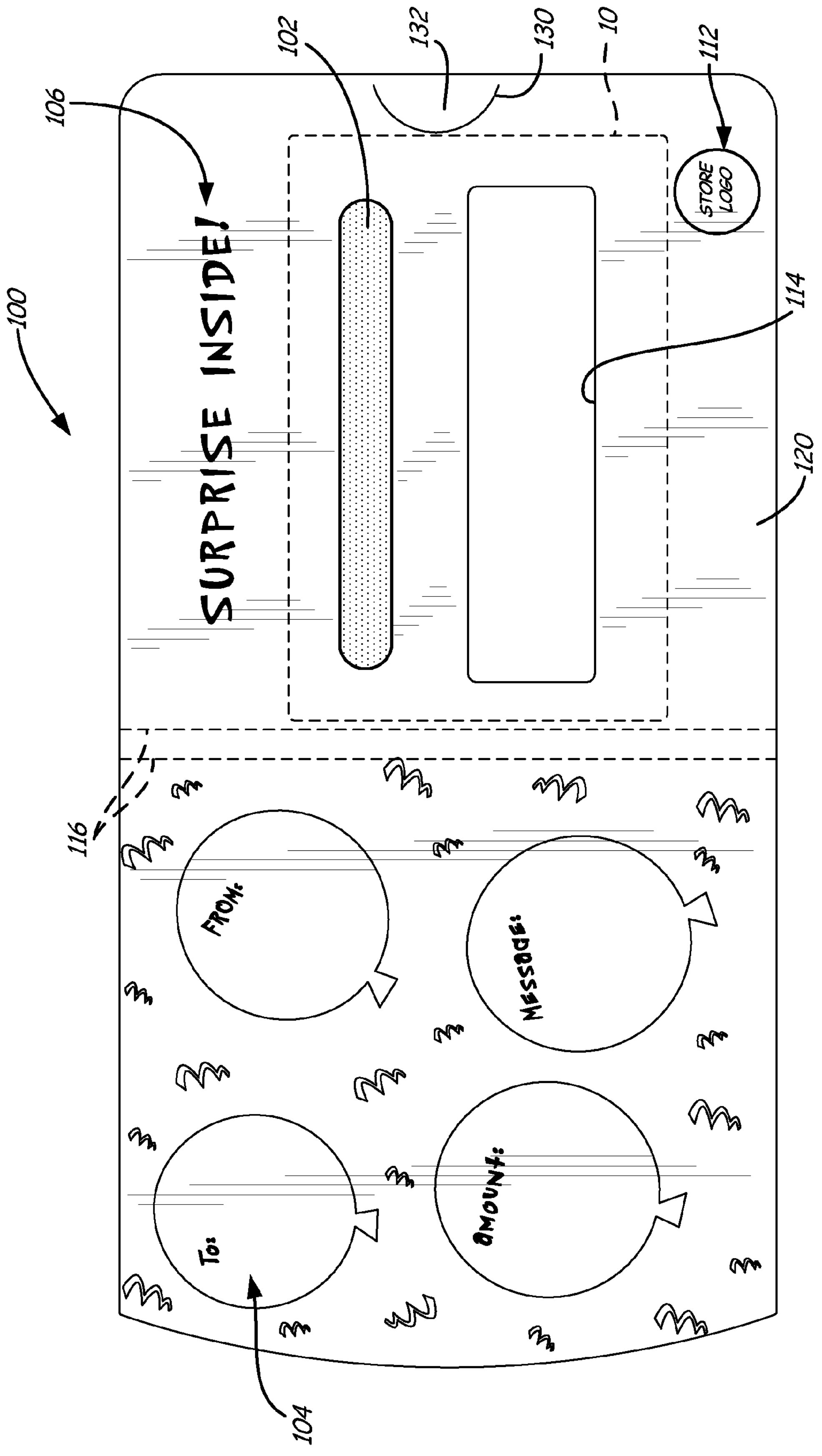
FIG. 10 is a front view illustrating one embodiment of an unfolded backer for supporting a stored-value card, according to the present invention.
Figure 11:
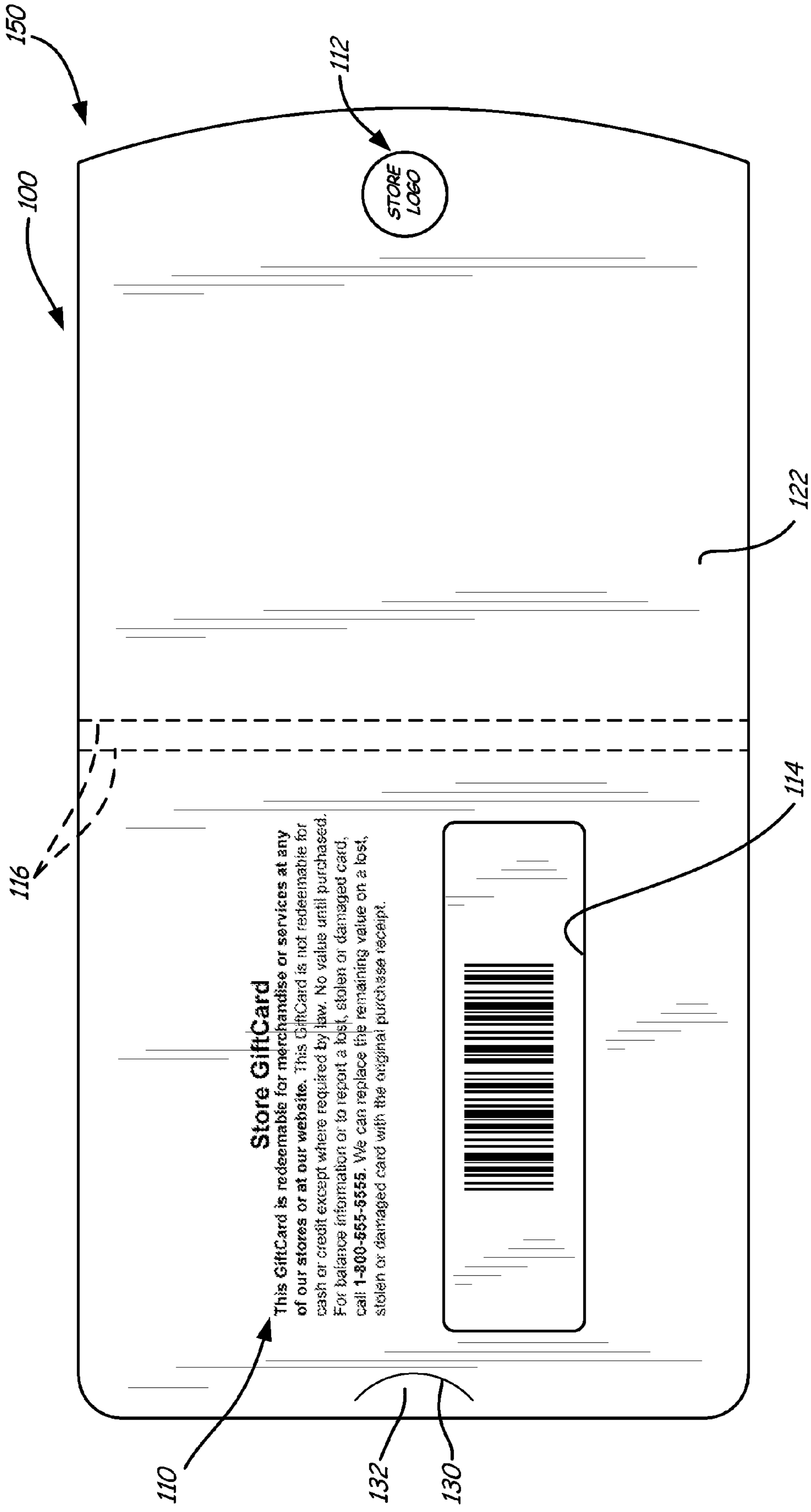
FIG. 11 is a rear view illustrating the unfolded backer of FIG. 10 with a stored-value card to form a stored-value card assembly, according to one embodiment of the present invention.

FIGS. 10 and 11 illustrate a carrier or backer 100 for supporting stored-value card 10. Stored-value card 10, which is represented in phantom lines in FIG. 10 for illustrative purposes so as to not obstruct backer 100, is readily releasably attached to backer 100, for example by a removable adhesive 102 or the like. Backer 100 and stored-value card 10 collectively define a stored-value card assembly 150 (FIG. 11). Backer 100 comprises a single layer or multiple layers of paper or plastic material, for example, generally in the form of a relatively stiff but bendable/flexible card. Use of other materials is also contemplated. Backer 100 displays indicia, graphics or text information including store logo(s), store name(s), slogans, advertising, instructions, directions, brand indicia, promotional information, holiday indicia, seasonal indicia, media format identifiers, characters, and/or other information.

For example, indicia 104 include to, from, amount, and message fields. The fields of indicia 104 provide areas of backer 100 configured to be written upon by a consumer to personalize backer 100 for presentation as a gift to a particular recipient, for a particular purpose, and/or to indicate a value of stored-value card 10.

In one example, indicia 106 promote that stored-value card 10 can be opened and/or that stored-value card 10 includes pop-up member 16. In one instance, indicia 106 state "Surprise Inside!" In one example, indicia 106 additionally or otherwise instruct the bearer of store-value card 10 on how to use stored-value card 10 for amusement.

Referring to FIG. 11, in one embodiment, indicia 110 indicate that stored-value card 10 is redeemable for the purchase of goods and/or services and that upon use, a value of the purchased goods and/or services will be deducted from the financial account or record linked to stored-value card 10. In one embodiment, indicia 110 include phrases such as "<NAME OF STORE> GiftCard" and "This GiftCard is redeemable for merchandise or services at any of our stores or at our website," and/or provides help or phone line information in case of a lost, stolen, or damaged stored-value card 10, etc.

Brand indicia 112 may also or alternatively be included and identify a store, brand, department, etc. and/or services associated with stored-value card 10. Any of indicia 40 (e.g., FIG. 1), 42 (e.g., FIG. 5), 104, 106, 110, 112, or other indicia optionally may appear anywhere on backer 100 or stored-value card 10. Additional information besides that specifically described and illustrated herein may also be included and/or one or more of indicia 40, 42, 44, 104, 106, 110, and 112 may be eliminated.

Backer 100 includes a window or opening 114 for displaying account identifier 90 of stored-value card 10 therethrough as illustrated in FIG. 11. As previously described, account identifier 90 is adapted for accessing a financial account or a financial record associated with stored-value card 10 for activating, loading, or debiting from the financial account or financial record. Accordingly, opening 114 allows viewing or other access to account identifier 90 to activate and/or load stored-value card 10 without removing stored-value card 10 from backer 100. In one embodiment, a portion of backer 100 alternatively is configured to be folded away from the remainder of backer 100 to access account identifier 90 without removing stored-value card 10 from backer 100.

In one embodiment, backer 100 is a bi-fold substrate defining at least one fold line 116, about which backer 100 is foldable roughly in half. In FIGS. 10 and 11, backer 100 is unfolded, i.e. is in an open configuration. According to one embodiment, FIG. 10 illustrates inside surfaces 120 of backer 100 that will be supported on a rack or other fixture to be visible to a consumer of a retail store who is considering the purchase of stored-value card 10. In one example, while on display in a retail store, backer 100 is folded back about fold line(s) 116 to present only portions of inside surfaces 120 of backer 100, i.e., surfaces illustrated in FIG. 10, that are positioned on the same side of fold line(s) 116 as stored-value card 10 to a consumer. In such an embodiment, indicia 104 would not be visible to a consumer when backer 100 and stored-value card 10 are placed for display in a retail store. Backer 100 is one example of means for supporting stored-value card 10 for display in a retail setting.

After purchase, backer 100 is foldable about fold line(s) 116 such that the FIG. 10 inside surfaces 120 of backer 100 are folded toward each other and stored-value card 10 is enclosed or wrapped in a compact package formed by foldable backer 100. In this manner, outer surfaces 122 of backer 100, i.e., the surfaces illustrated in FIG. 11, are disposed toward the outside of the folded, compact package, according to embodiments of the invention. In one embodiment, folded backer 100 effectively wraps stored-value card 10 for presentation from a consumer to a recipient. Folding backer 100 in the other direction about fold line(s) 116 for display on a rack in a retail setting, or about other fold lines of backer 100 is also contemplated. In one embodiment, fold line(s) 116 are one or more fold lines of a plurality of fold lines 116 positioned to accommodate an overall thickness of or to otherwise wrap stored-value card 10 as will be apparent to those of skill in the art upon reading this application.

In one embodiment, a cut 130 is formed through backer 100 near an edge of backer 100 spaced from and substantially parallel to fold line(s) 116. Cut 130 extends partially toward fold line(s) 116 and defines a flap 132, which can be partially bent away from the remainder of backer 100. More specifically, upon folding of backer 100 about fold line(s) 116 to close backer 100 around stored-value card 10, an opposing edge of backer 100 is tucked beneath flap 132 to maintain backer 100 in a folded or closed position. In one embodiment, cut 130 and thereby flap 132 are each substantially semi-circular in shape. Other backers similar to backer 100 can be used having various sizes and shapes for supporting stored-value card 10.

Figure 12:
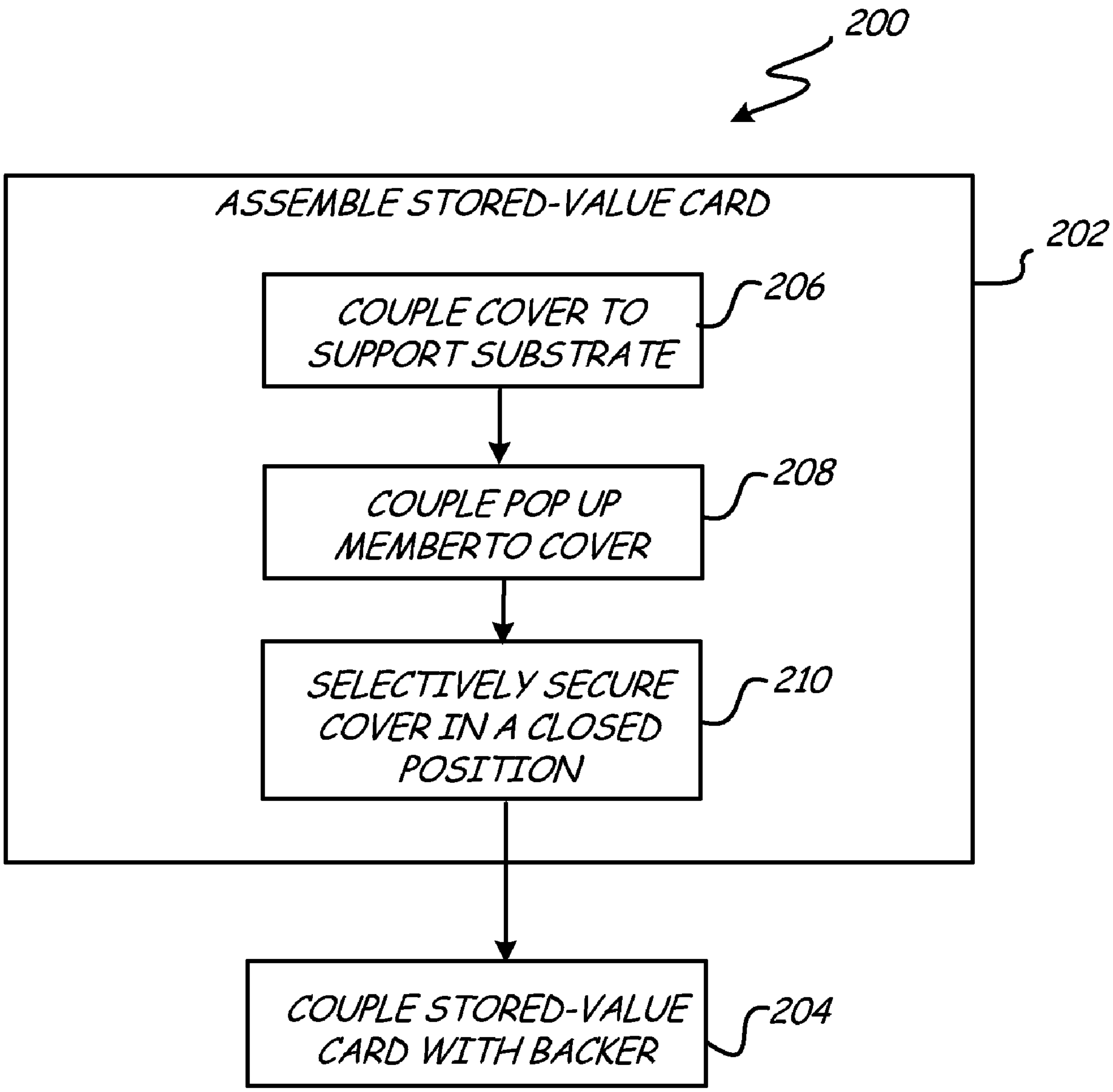
FIG. 12 is a flow chart illustrating a method of assembling a stored-value card assembly, according to one embodiment of the present invention.

FIG. 12 is a flow chart illustrating one embodiment of a method 200 of assembling stored-value card assembly 150 (FIG. 11) and is described with particular reference to stored-value card 10 (e.g. FIG. 1) and backer 100 (FIGS. 10 and 11). At 202, stored-value card 10 is assembled and, at 204, stored-value card 10 is coupled with backer 100 to form stored-value card assembly 150. In one embodiment, assembly at 206, includes coupling cover 14 to substrate 12 for support. More specifically, in one embodiment, outside surface 32 of second cover panel 38 is adhered or otherwise affixed to second first surface 20 of substrate 12. In one example, second cover panel 38 is sized similar to substrate 12 such that when coupled together, second cover panel 38 and substrate perimeters are substantially aligned and second cover panel 38 substantially covers first surface 20 of substrate 12.

At 208, assembly of stored-value card 10 continues by coupling pop-up member 16 to cover 14. In particular, inside surface 52 of pop-up member 16 is coupled with inside surface 30 of cover 14. In one example, first portion 70 of pop-up member 16 is coupled with first cover panel 36, and fourth portion 76 of pop-up member 16 is coupled with second cover panel 38. Upon assembly, pop-up member 16 is configured to fold up for selective and relatively flat storage between first and second cover panels 36 and 38 and to fold outwardly upon opening of cover 14 as described above. Although illustrated as occurring after assembly operation 206, in one embodiment, assembly operation 208 occurs prior to assembly operation 206.

In one embodiment, at 210, cover 14 is selectively secured in a closed position such as, for example, by placing a removable sticker 96 around an edge of stored-value card 10. In one embodiment, cover 14 is not so secured and operation step 210 is eliminated. Other general methods of assembling stored-value card 10 and other embodiments with be apparent to one of skill in the art upon reading this application. For instance, stored-value card 10 with cover 14 and pop-up member 16 is a relatively simple pop-up construction. In one embodiment, more complicated pop-up constructions may be utilized thereby impacting the overall assembly of stored-value card 10 as will be apparent to those of skill in the art upon reading this application.

At 204, the assembled stored-value card 10 is coupled with backer 100 (FIGS. 10 and 11) to form stored-value card assembly 150. In one example, stored-value card 10 is coupled to backer 100 with adhesive 102 or other selectively releasable material or device. Once stored-value card 10 is coupled to backer 100, account identifier 90 is viewable through window 114 of backer 100. In one embodiment, backer 100 is folded into a folded position for shipment to and/or display in retail settings. Backer 100 is, more specifically, folded by folding backer 100 about fold line(s) 116 such that outer surfaces 122 illustrated in FIG. 11 are moved toward each other. As such, a portion of backer 100 with stored-value card 10 is visible from one side of folded backer 100. Backer 100 can also be folded in the opposite direction about fold line(s) 116 to substantially enclose stored-value card 10. In one embodiment, backer 100 is displayed in position in which outer surfaces 122 are folded toward one another.

Figure 13:
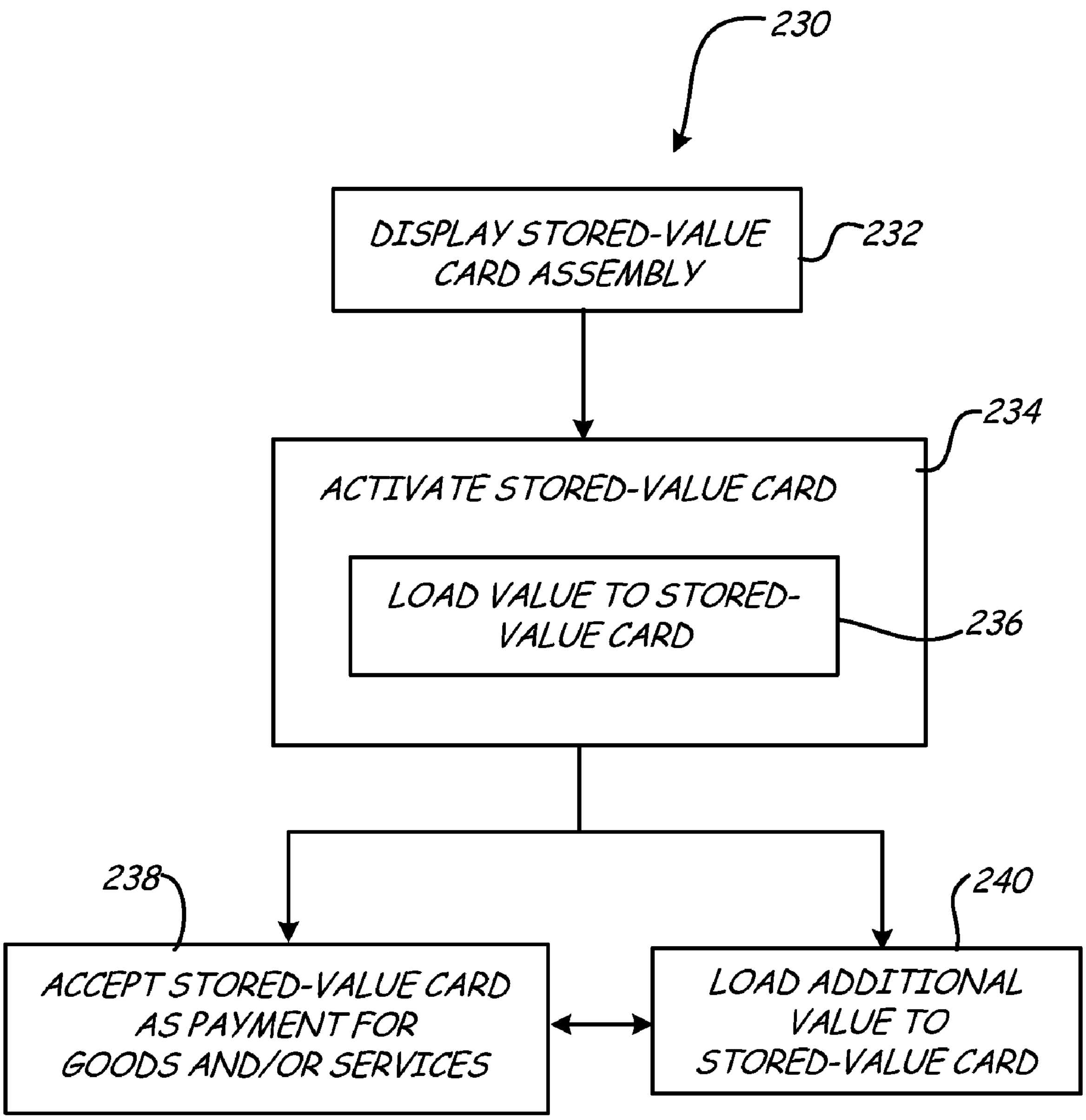
FIG. 13 is a flow chart illustrating a method of encouraging purchase and facilitating use of a stored-value card assembly, according to one embodiment of the present invention.

FIG. 13 is a flow chart illustrating one embodiment of a method 230 of encouraging purchase and facilitating use of stored-value card 10 by consumers. At 232, stored-value card 10 is placed or hung from a rack, shelf, or other similar device to display stored-value card 10 for sale to potential consumers. In one example, stored-value card 10 is placed for retail sale when assembled to backer 100 as part of stored-value card assembly 150. In one embodiment, stored-value card 10 is displayed without backer 100 and/or a depiction of stored-value card 10 is placed on a website for viewing and purchase by potential consumers.

At 234, a consumer who has decided to purchase stored-value card 10 presents the stored-value card 10 on backer 100 to a retail store employee, retail store kiosk, remote terminal, or other person or device to scan account identifier 90 to access a financial account or financial record linked to account identifier 90. In particular, account identifier 90 is scanned or otherwise accessed, for example through window 114 of backer 100 to activate stored-value card 10.

Upon accessing the financial account or financial record, then, at 236, value is added to the financial account or financial record. Thus, stored-value card 10 is activated and loaded. Once stored-value card 10 is activated and loaded, stored-value card 10 can be used by the consumer or any other bearer of stored-value card 10 to purchase goods and/or services at the retail store or other affiliated retail setting or website. In one embodiment, where stored-value card 10 is displayed on a website at 232, then, at 234, stored-value card 10 may be activated in any suitable method and may not require the physical scanning of account identifier 90 to be activated or to otherwise access the associated financial account or record such as at 236.

At 238, the retail store or other affiliated retail setting or website accepts stored-value card 10 as payment towards the purchase of goods and/or services made by the current bearer of stored-value card 10. In particular, the value currently loaded on stored-value card 10 (i.e. stored or recorded in the financial record or account linked to account identifier 90) is applied toward the purchase of goods and/or services. At 240, additional value is optionally loaded on stored-value card 10 at a point of sale terminal, kiosk, or other area of the retail store or related setting.

Upon accepting stored-value card 10 as payment at 238, the retail store or related setting can subsequently perform either operation 238 or operation 240 as requested by a current bearer of stored-value card 10. Similarly, upon loading additional value on stored-value card 10 at 240, the retail store or related setting can subsequently perform either operation 240 again or operation 238. In one example, the ability to accept stored-value card 10 as payments for goods and/or services at 238 is limited by whether the financial account or financial record associated with stored-value card 10 has any value stored or recorded therein at the time of attempted redemption.

Figure 14:
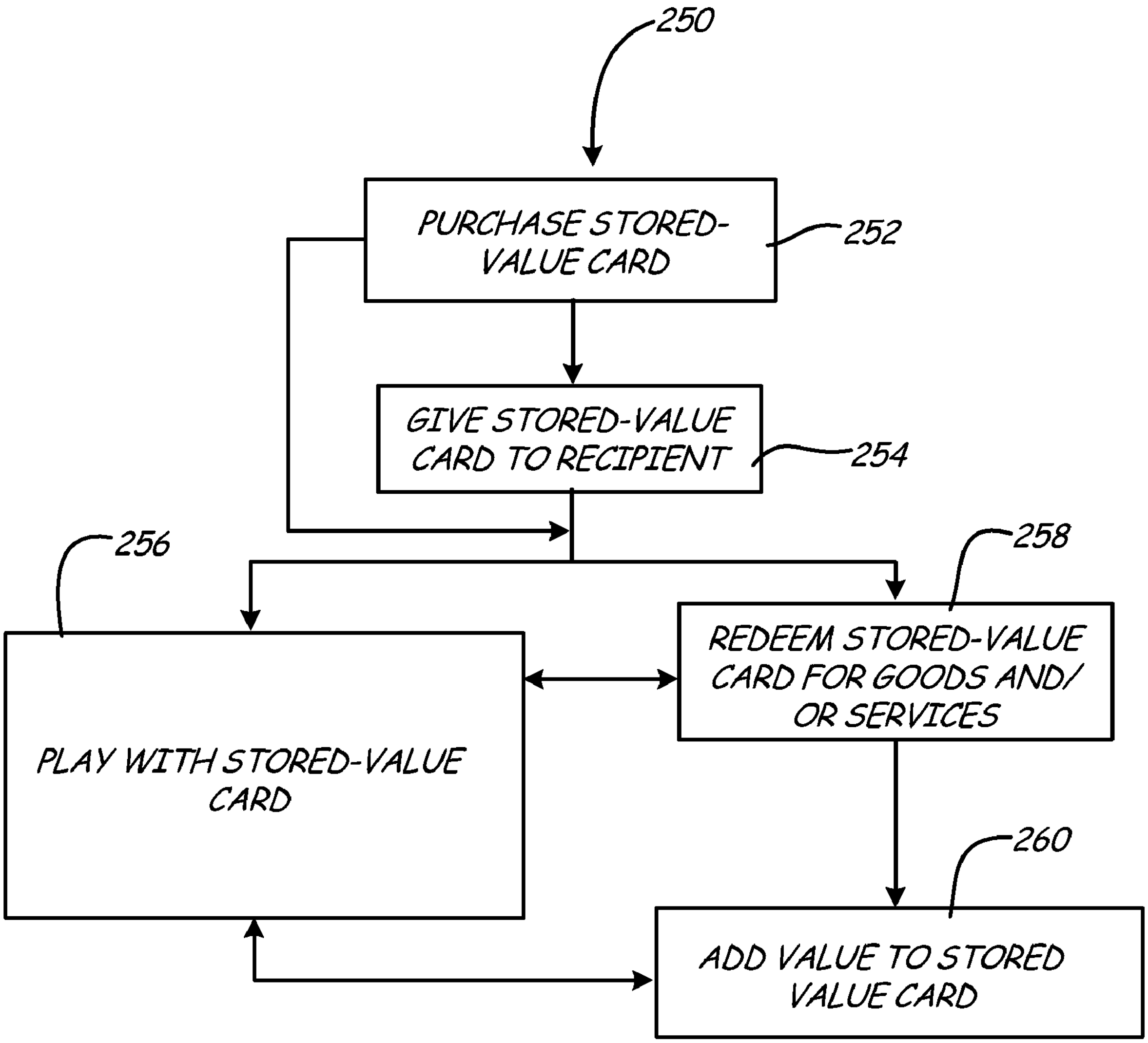
FIG. 14 is a flow chart illustrating a method of using a stored-value card, according to one embodiment of the present invention.

FIG. 14 is a flow chart illustrating one embodiment of a method 250 of using stored-value card 10 (FIG. 1). At 252, a potential consumer of stored-value card 10, which is displayed in a retail store or viewed on a website, decides to and does purchase stored-value card 10 from the retail store or website. Stored-value card 10 can be displayed and purchased alone or as part of stored-value card assembly 150 (FIG. 11) along with backer 100. Upon purchasing a stored-value card 10, a retail store employee, a retail store kiosk, or other person or device scans account identifier 90 (FIGS. 3 and 11) through window 114 of backer 100 or otherwise reads or accesses account identifier 90. Upon accessing account identifier 90, the financial account or record linked to account identifier 90 is accessed and activated to load value onto stored-value card 10. In one embodiment, such as where stored-value card 10 is purchased at 252 via a website, actual scanning of account identifier 90 may be eliminated.

At 254, the consumer optionally gives stored-value card 10 to a recipient, such as a graduate, relative, friend, expectant parents, one having a recent or impending birthday, a couple having a recent or impending anniversary, etc. In one embodiment, a plurality of stored-value cards 10 are purchased and given to party goers, such as at a birthday party, etc. as party favors or gifts. As an alternative, the consumer can keep stored-value card 10 for his or her own use thereby eliminating operation 254.

At 256, the consumer or recipient, whoever is in current ownership or otherwise is the current bearer of stored-value card 10, plays with stored-value card 10. In one embodiment, to play with stored-value card 10, the card bearer removes stored-value card 10 from backer 100 if stored-value card 10 is coupled with backer 100 and at least partially releases sticker 96, if so included. Subsequently, cover 14 of stored-value card 10 is opened causing pop-up member 16 to fold outwardly or, in other words, to pop-up, from cover 14. The movement of pop-up member 16 serves to amuse the card bearer and or others viewing the opening of stored-value card 10, more particularly, cover 14. The amusing aspect of stored-value card 10 is a useful tool in encouraging initial purchase of stored-value card 10 and in encouraging future use and/or additionally loading of value onto stored-value card 10. In one embodiment, cover 14 can be opened as part of operation 256 without removing stored-value card 10 from backer 100.

At 258, the current bearer of stored-value card 10 redeems stored-value card 10 for goods and/or services from the retail store or website. At 260, the current bearer of stored-value card 10 optionally adds value to stored-value card 10, and more particularly, to the financial account or financial record associated with stored-value card 10, at the retail store or over the Internet (i.e. via the website). Upon playing with stored-value card 10 at 256, redeeming stored-value card 10 at 258, or adding value to stored-value card 10 at 260, the current bearer of stored-value card 10 subsequently can perform any of operations 256, 258, or 260 as desired. In one embodiment, the ability of the current bearer to repeat redeeming stored-value card 10 at 258 is limited by whether the financial account or financial record associated with stored-value card 10 has any remaining value stored or recorded therein at the time of attempted redemption.

Although described above as occurring at a single retail store or website, in one embodiment, purchasing stored-value card 10 at 252, redeeming stored-value card 10 at 258, and adding value to stored-value card 10 at 260, can each be performed at any one of a number of stores adapted to accept stored-value card 10 or over the Internet. In one example, a number of stores are each part of a chain or similarly branded stores. In one example, a number of stores include at least one website and/or at least one conventional brick and mortar store.

Figure 15:
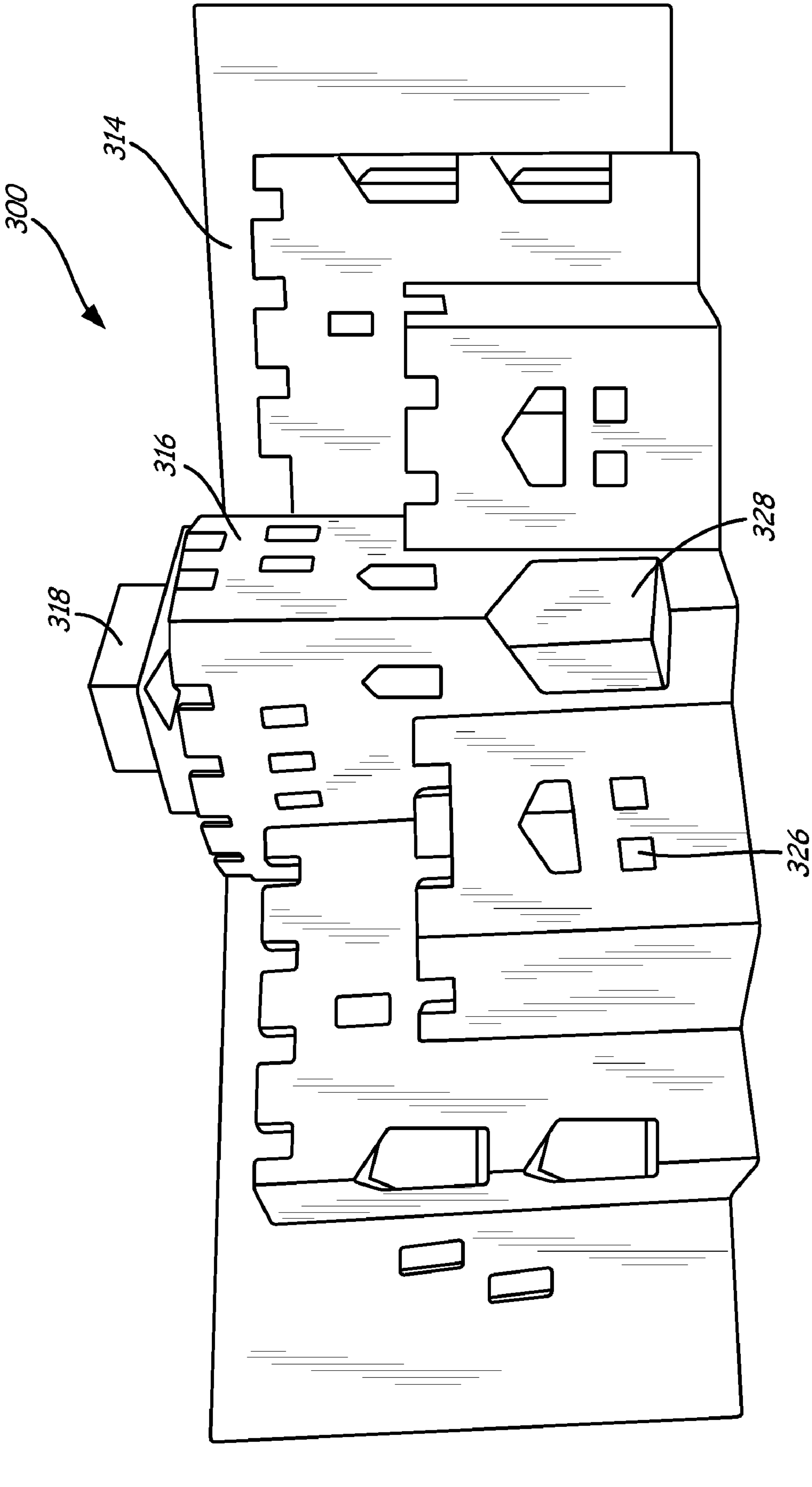
FIG. 15 is a perspective view illustrating a stored-value card in an open position, according to one embodiment of the present invention.

FIG. 15 illustrates another embodiment of a stored-value card 300. Stored-value card 300 is similar to stored-value card 10; however, stored-value card 300 includes a plurality of pop-up members 316 attached to cover 314 and/or to one another to collectively create a compound member pop-up feature. In one example, the plurality of pop-up members 316 define a member 318 configured to move in a lateral direction when stored-value card 300 is opened such that pop-up member 318 selectively extends outside the general lateral boundaries of cover 14 when open and folds back within the lateral boundaries of cover 14 when stored-value card 10 is closed.

In one instance, pop-up members 316 of stored-value card 300 additionally include any number of internal cuts so as to define apertures 326 and/or internal folding portions 328. As such, pop-up members 316 are generally more intricate than pop-up member 16 (e.g., FIG. 1). As will be apparent to one of skill in the art upon reading this application, pop-up members 16 and 316 or similar pop-up members may be used alone or in combination as necessary to achieve a desired overall amusing effect of stored-value card 10. In one embodiment, the additional intricacy of pop-up members 316 is possible due in part to the flexibility and relatively low rigidity of the material forming cover 314 as compared to the material of substrate 12 (e.g., FIG. 9) when included in a similar manner as described above with respect to stored-value card 10 (e.g., FIG. 9).

Figure 16:
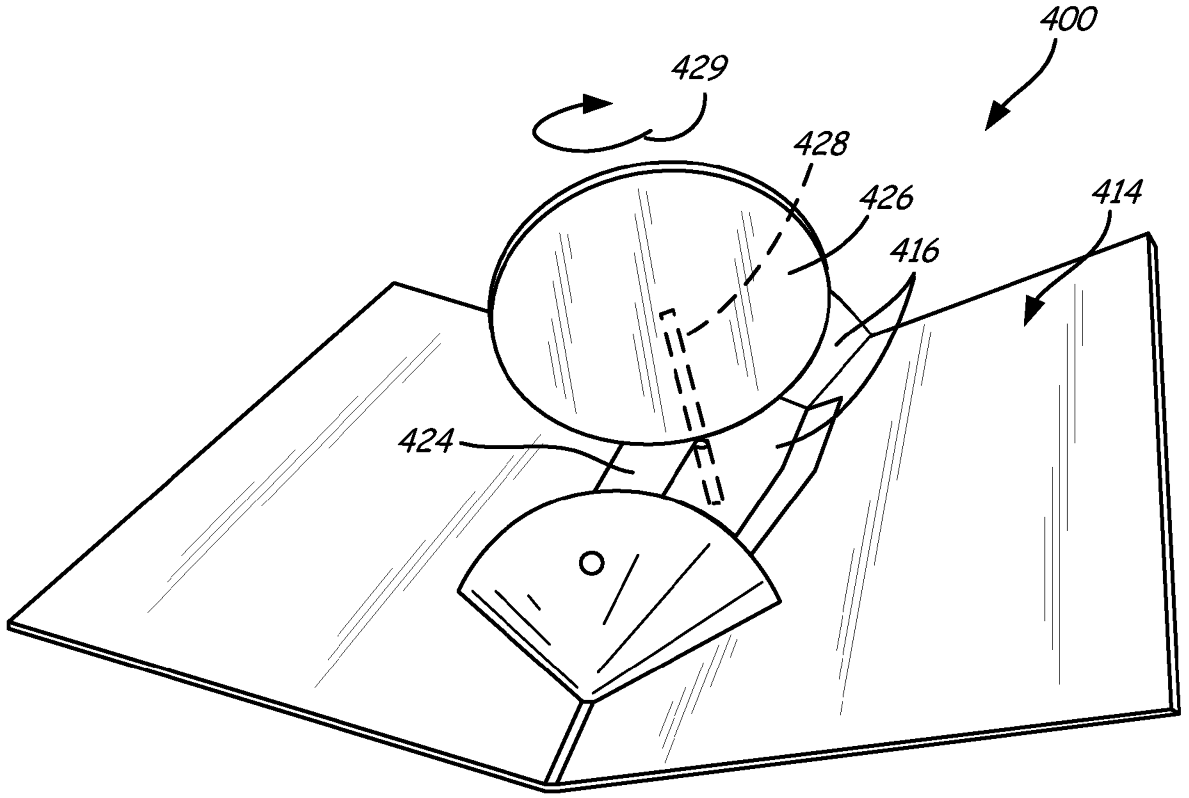
FIG. 16 is a perspective view illustrating a stored-value card in an open position, according to one embodiment of the present invention.

FIG. 16 illustrates one embodiment of a stored-value card 400. Stored-value card 400 is similar to stored-value card 10; however, stored-value card 400 includes a plurality of pop-up members 416 coupled with or otherwise associated with cover 414 to create a compound member pop-up. In one example, the plurality of pop-up members 416 include a main pop-up member 424, and a rotating member 426. Main pop-up member 424 is attached and folds relative to cover 414 in a similar manner as described with respect to pop-up member 16 and cover 14 above.

Rotating member 426 includes a shaft 428 extending through a portion of main pop-up member 424 such that rotating member 426 is configured to rotate about shaft 428 as generally indicated by arrow 429. Rotating member 426 and shaft 428 are configured to transition upon closing such that rotating member 426 with main pop-up member 424 both collectively fold substantially flat. In one embodiment, a string or other member (not shown) may also be incorporated and stored-value card 400 to facilitate folding and unfolding of the plurality of pop-up members 416 and to initiate rotation of rotating member 426 as will be apparent to those of skill in the art upon reading this application.

Various pop-up members 16, 316, 318, 416, 424, and 428 have been described above, and it should be understood that the features of any and/or all of pop-up members 16, 316, 318, 416, 424, and 428 can generally be interchanged and/or collectively used together to create a desired effect. Further, other pop-up configurations that will be apparent to those of skill in the art upon reading this application have been contemplated and fall within the scope of the present invention. In one embodiment, sound, light, and/or other features may also be incorporated into stored-value card 10, 300, and/or 400 as will also be apparent to those of skill in the art upon reading this application.

Stored-value cards come in many forms, according to embodiments of the invention. The gift card, like other stored-value cards, can be "re-charged" or "re-loaded" at the direction of the original consumer, the gift recipient, or third party. The term "loading on" or "loaded on" herein should be interpreted to include adding to the balance of a financial account or financial record associated with a stored-value card. The balance associated with the stored-value card declines as the card is used, encouraging repeat visits. The card remains in the user's purse or wallet, serving as an advertisement or a reminder to revisit the associated merchant. Gift cards according to embodiments of the invention provide a number of advantages to both the consumer and the merchant. Other gift cards and stored-value cards according to embodiments of the invention include loyalty cards, merchandise return cards, electronic gift certificates, employee cards, frequency cards, prepaid cards, and other types of cards associated with or representing purchasing power or monetary value, for example.

Although the invention has been described with respect to particular embodiments, such embodiments are meant for illustrative purposes only and should not be considered to limit the invention. Various alternatives and changes will be apparent to those of ordinary skill in the art. For example, other stored-value card structures including movable graphic portions may be used. Other modifications within the scope of the invention and its various embodiments will be apparent to those of ordinary skill.

What is claimed is:

1. A financial transaction card comprising:

an account identifier linking the financial transaction card to at least one of a financial account or a financial record;

a cover configured to fold about a fold line between an open and a closed position;

a pop-up member coupled with the cover on both sides of the fold line and configured to transition between a relatively flat position when the cover is in the closed position and an extended position when the cover is in the open position, wherein the pop-up member is stored between at least two portions of the cover when the cover is in the closed position; and a substrate rigidly secured to the cover to strengthen the financial transaction card.

2. The financial transaction card of claim 1, wherein the substrate includes plastic and the cover includes paper.

3. The financial transaction card of claim 1, wherein the cover is bi-fold and defines a first cover panel and a second cover panel hingedly coupled with one another, such that the pop-up member is interposed between the first cover panel and the second cover panel when the cover is in the closed position.

4. The financial transaction card of claim 3, wherein the pop-up member includes a first portion, a second portion adjacent the first portion, a third portion adjacent the second portion opposite the first portion, and a fourth portion adjacent the third portion opposite the second portion, wherein the first portion is coupled with the first cover panel, the fourth portion is coupled with the second cover panel, and wherein each of the first portion, the second portion, the third portion, and the fourth portion are configured to be folded relative to a respective adjacent one of the first portion, the second portion, the third portion, and the fourth portion.

5. The financial transaction card of claim 4, wherein the second portion folds relative to the first portion in a similar manner as the fourth member folds relative to the third portion and in an opposite manner as the third portion folds relative to the second portion.

6. The financial transaction card of claim 1, further comprising a sticker positioned to selectively maintain the cover in the closed position.

7. The financial transaction card of claim 1, in combination with a backer configured to support the financial transaction card during display, the backer including an opening positioned such that the account identifier is accessible for reading through the backer via the opening.

8. The financial transaction card of claim 1, wherein longitudinal edges of the pop-up member are substantially nonlinear.

9. The financial transaction card of claim 1, wherein the pop-up member is one of a plurality of pop-up members coupled to at least one of each other and the cover.

10. The financial transaction card of claim 1, wherein the pop-up member includes at least one of internal apertures and internal folding portions.

11. The financial transaction card of claim 1, further comprising a spinning member extending from the pop-up member and configured to rotate about a shaft extending at least partially through the pop-up member.

12. The financial transaction card of claim 1, wherein the account identifier is substantially permanently affixed to the substrate.

13. The financial transaction card of claim 1, wherein:
the substrate includes a first surface and a second surface;
the first surface and the second surface are spaced apart and face in opposite directions;
the account identifier is included on the first surface; and
the cover is coupled to the second surface such that the cover and the account identifier are located on opposite surfaces.

14. The financial transaction card of claim 1, wherein the substrate and the cover comprise a substantially same footprint.

15. A financial transaction card, comprising:
an account identifier linking the financial transaction card to at least one of a financial account or a financial record;
a cover configured to fold about a fold line between an open and a closed position, wherein:
the cover is bi-fold and defines a first cover panel and a second cover panel hingedly coupled with one another, such that the pop-up member is interposed between the first cover panel and the second cover panel when the cover is in the closed position;
a pop-up member coupled with the cover on both sides of the fold line and configured to transition between a relatively flat position when the cover is in the closed position and an extended position when the cover is in the open position, wherein the pop-up member is stored between at least two portions of the cover when the cover is in the closed position; and
a substrate sized and shaped similar to and coupled to the second cover panel to strengthen the financial transaction card.

16. A stored-value card comprising:
means for rotating between an open position and a closed position;
means for outwardly extending from the means for rotating when the means for rotating is in the open position and for collapsing when the means for rotating is transitioned to the closed position;
means for associating the stored-value card with a financial account or record such that the stored-value card can be used toward the purchase of goods and/or services; and
means for increasing the rigidity of the stored-value card, the means for increasing the rigidity being rigidly coupled to at least a portion of the means for rotating,
wherein the means for associating the stored-value card is included on the means for increasing the rigidity of the stored-value card.

17. The stored-value card of claim 16, further comprising means for maintaining the means for rotating in a closed position.

18. The stored-value card of claim 16, in combination with means for supporting and selectively wrapping the stored-value card including means for providing access to the means for associating the stored-value card with a financial account or record through the means for supporting.

19. The stored-value card of claim 16, wherein:
the means for increasing the rigidity of the stored-value card includes a first side and a second side spaced apart and facing in opposite directions;
the means for rotating between the open position and the closed position is coupled to the first side; and
the means for associating the stored-value card with the financial account or record is coupled to the second side such that the means for rotating between the open position and the closed position and the means for associating the stored-value card with the financial account or record are located on opposite sides of the means for increasing the rigidity of the stored-value card.

20. The stored-value card of claim 19, wherein the means for increasing the rigidity of the stored-value card and the at least the portion of the means for rotating are coextensive and define similarly sized and shaped outer perimeters.

21. A method of encouraging purchase and facilitating use of a financial transaction card, the method comprising:
displaying the financial transaction card, the financial transaction card including an account identifier linking the financial transaction card to a financial account or record, a foldable member and an auxiliary member, the foldable member defining an outside surface and an inside surface, and the auxiliary member being coupled with the inside surface such that when the foldable member is transitioned toward a closed position, the auxiliary member folds into a relatively flat position, and when the foldable member is transitioned toward an open position, the auxiliary member unfolds to extend outwardly from the inside surface of the foldable member;
a substrate rigidly secured to the foldable member to strengthen the financial transaction card;
informing potential consumers that the financial transaction card includes a pop-up member; and
activating the financial transaction card to permit deductions from the financial account or record.

22. The method of claim 21, further comprising receiving the financial transaction card as payment for goods or services, at least a portion of a value of the goods or services being deducted from the financial account or the financial record.

23. A financial transaction assembly, comprising:
a cover including:
a first panel including:
a first face, and
a second face spaced apart and facing in a direction opposite the first face;
a second panel coupled to the first panel along a fold line, the second panel including:
a third face, and
a fourth face spaced apart and facing in a direction opposite the third face, the second panel being configured to fold at the fold line to selectively fold between an open position and a closed position with respect to the second face and the fourth face;
a pop-up member coupled to the second face and the fourth face at opposite sides of the fold line, the pop-up member configured to transition between a relatively flat position when the second panel is in the closed position and an extended position when the second panel is in the open position; and
a substrate member including:
a fifth face rigidly coupled to the first face,
a sixth face spaced apart and facing in a direction opposite the fifth face, and an account identifier linking the substrate member to at least one of a financial account or a financial record, the account identifier being located on the sixth face such that the account identifier is located away from the first panel, wherein the fifth face and the first face are coextensive and include perimeters having similar sizes and shapes.

* * * * *